United States Patent [19]
Enderlein

[11] Patent Number: 5,209,363
[45] Date of Patent: May 11, 1993

[54] MECHANICAL COUPLING FOR OVERHEAD TROLLEYS WITH COOPERATIVELY MATING PRIZMATIC PROJECTIONS

[75] Inventor: Robby Enderlein, Landsberg/Lech., Fed. Rep. of Germany

[73] Assignee: RSL Logistik GmbH & Co., Landsberg/Lech., Fed. Rep. of Germany

[21] Appl. No.: 821,369

[22] Filed: Jan. 16, 1992

[30] Foreign Application Priority Data

Jan. 29, 1991 [DE] Fed. Rep. of Germany ... 9101000[U]

[51] Int. Cl.⁵ .............................................. B61G 3/00
[52] U.S. Cl. .................... 213/100 R; 213/100 R; 213/75 R; 213/77
[58] Field of Search ................. 213/1 R, 74, 75 R, 77, 213/78, 79, 80, 82, 84, 85, 88, 89, 90, 96, 97, 100 W, 100 R, 101, 151, 175, 177, 178, 179, 182, 183

[56] References Cited

U.S. PATENT DOCUMENTS

| | | | |
|---|---|---|---|
| 1,896,959 | 2/1933 | Kurtossy | 213/100 R |
| 2,701,152 | 2/1955 | Cutler | 213/75 R |
| 3,405,811 | 10/1968 | Cope | 213/100 W |
| 4,893,716 | 1/1990 | Diller | 213/90 X |
| 5,014,864 | 5/1991 | Richter et al. | 213/101 X |
| 5,142,993 | 9/1992 | Robu et al. | 213/75 R |

FOREIGN PATENT DOCUMENTS 63018 3/1925 Hungary ............................ 213/77

*Primary Examiner*—Robert J. Oberleitner
*Assistant Examiner*—S. Joseph Morano
*Attorney, Agent, or Firm*—Finnegan, Henderson, Farabow, Garrett & Dunner

[57] ABSTRACT

A mechanical coupling for coupling together two spaced conveyor rods adapted to be moved on rollers on a suspension conveyor system, the rods extending in their direction of transport and being aligned with respect to each other, the coupling comprising two coupling members and each of the coupling members being arranged on one of the conveyor rods. Each coupling member includes a coupling face, the coupling face of each being adapted to be moved relative to the coupling face of the other coupling member. In the coupled condition, the coupling faces of the two coupling members engage one behind the other in a direction transverse to the longitudinal center line. In order to permit the use of a mechanical coupling of this type in an automated sequence of operations, a rigid coupling connection is provided so that the distance between the conveyor rods remains essentially constant even under the influence of transporting forces. For this purpose, one coupling member includes at least one stop face, which extends transverse to the direction of transport and which is associated with the coupling face, the stop face abutting on a corresponding stop face on the other coupling member in the engaged condition of the coupling.

17 Claims, 6 Drawing Sheets

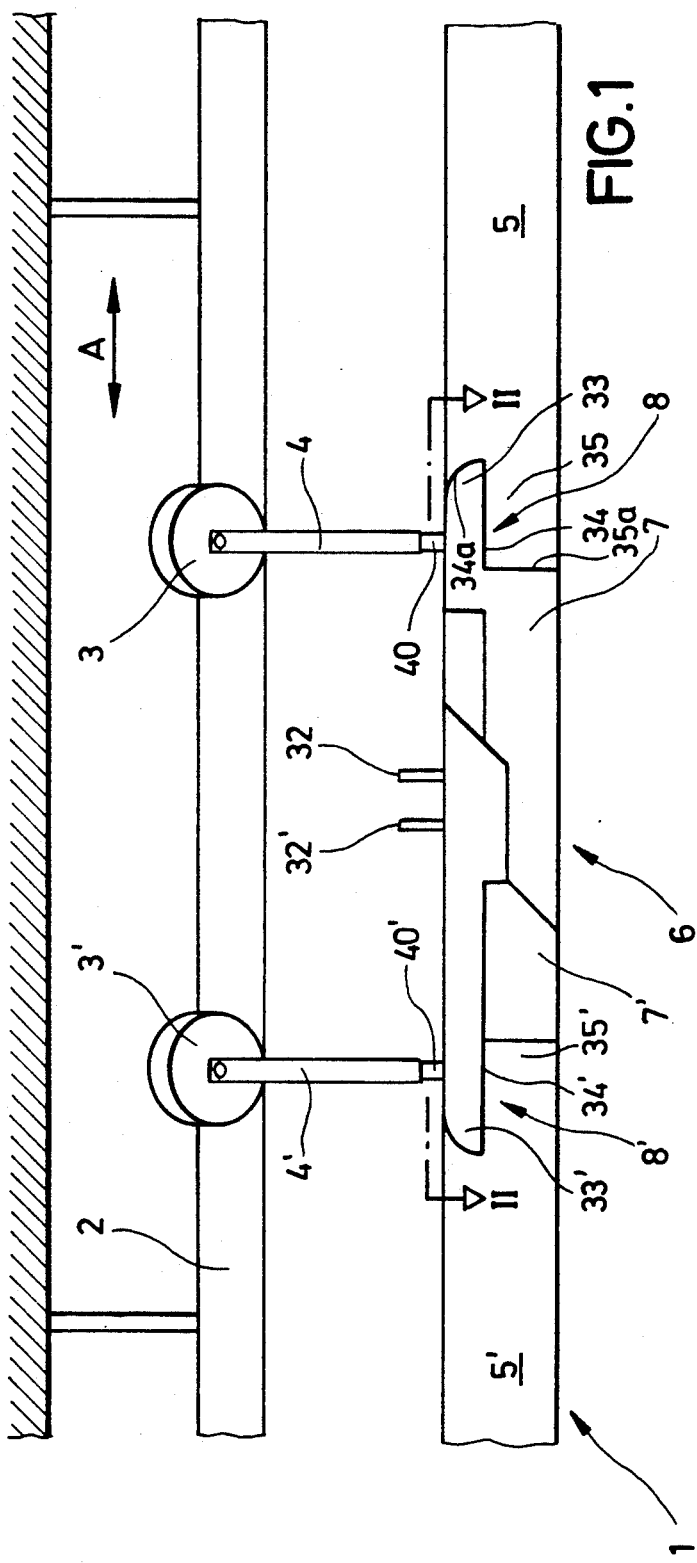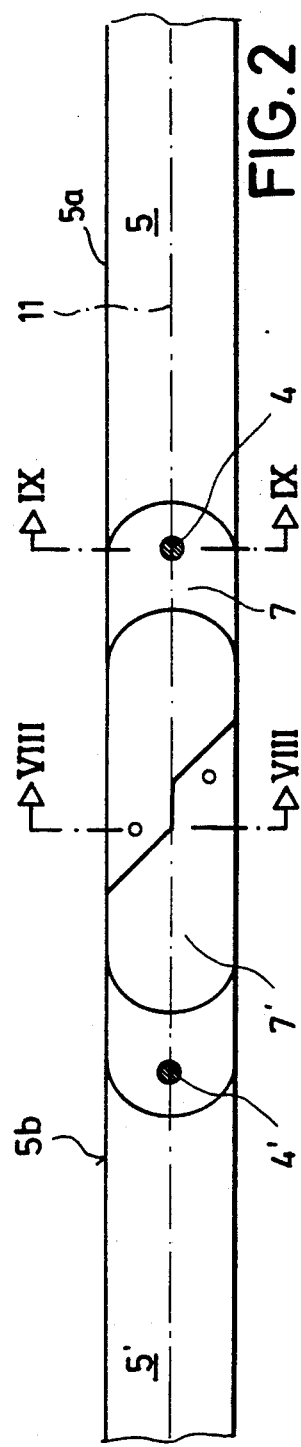

MECHANICAL COUPLING FOR OVERHEAD TROLLEYS WITH COOPERATIVELY MATING PRIZMATIC PROJECTIONS

BACKGROUND OF THE INVENTION

The present invention refers to a coupling for rigidly coupling together two spaced conveyor means adapted to be moved on rollers on a suspension conveyor system.

Such a coupling is known from U.S. Pat. No. 1,896,959. The known coupling is described as being adapted to be coupled automatically, when the conveyor means connected to the individual coupling members move towards one another. In the case of the known coupling, the coupling face constitutes part of a stop face, which, when viewed in plan, has a configuration which is curved like an S. In the course of the automatic coupling operation, it may therefore easily happen that, especially if the two conveyor means to be coupled move at comparatively high speeds and/or if the conveyor means have a comparatively low weight—as in the case of suspension conveyor systems—the two coupling members, supported by inclined end faces of the projections, are pushed beyond the coupling position and laterally past one another. Moreover, the known coupling only acts as a rigid coupling—i.e., when engaged, it does not permit any relative movement between the coupling members—in view of the fact that both members have to be fixed by pins which are to be inserted. This, however, has to be done by hand.

Hence, the present invention is based on the task of providing a coupling permitting, especially in the case of suspension conveyor systems, a reliable and fully automatic coupling operation.

SUMMARY OF THE INVENTION

The coupling face, in accordance with the present invention, projects beyond a flat stop face extending parallel to the direction of transport, to interrupt the deflection process of the two coupling members during the coupling operation before the coupling faces can come into engagement with each other. The probability that a coupling operation will be impeded or even be made impossible, when the coupling members are pushed together to an excessive extent, is thus substantially diminished.

BRIEF DESCRIPTION OF THE DRAWING

Embodiments of the present invention will be explained hereinbelow on the basis of the drawings, in which FIG. 1 shows a schematic representation of part of a suspension conveyor system constructed in accordance with the present invention, FIG. 2 shows a sectional view taken along the line II—II of FIG. 1.

DETAILED DESCRIPTION OF THE INVENTION

Figure 3:
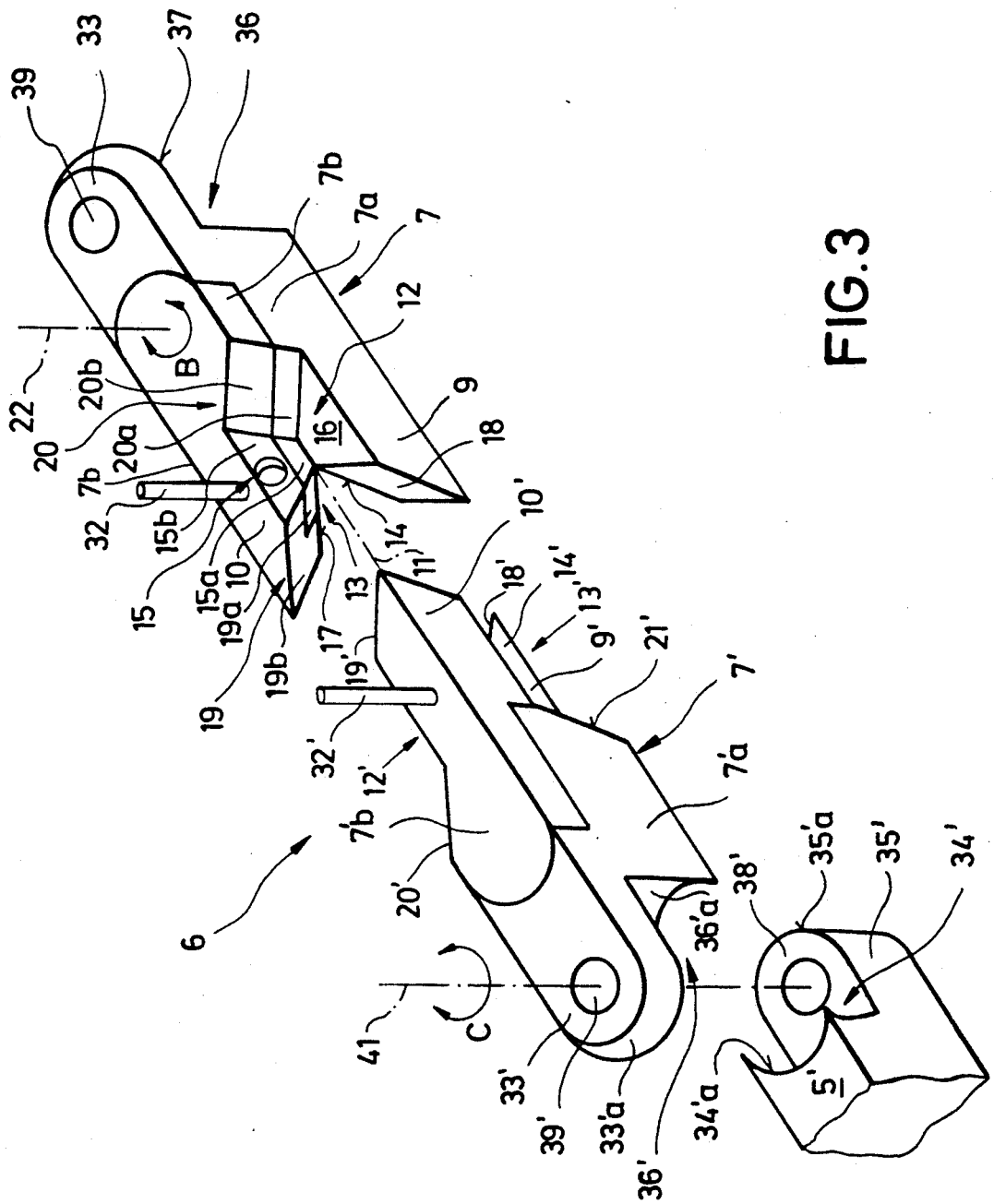
FIG. 3 shows a perspective, enlarged view of the coupling according to the present invention.
Figure 4:
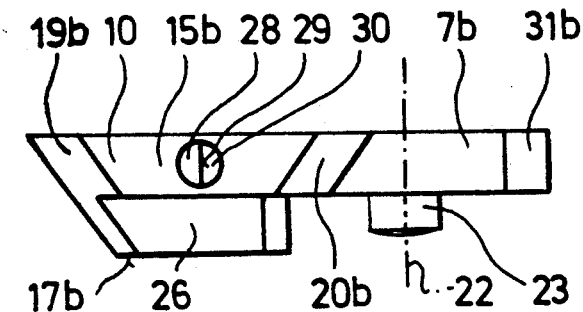
FIG. 4 shows a side view of part of the coupling.
Figure 5:
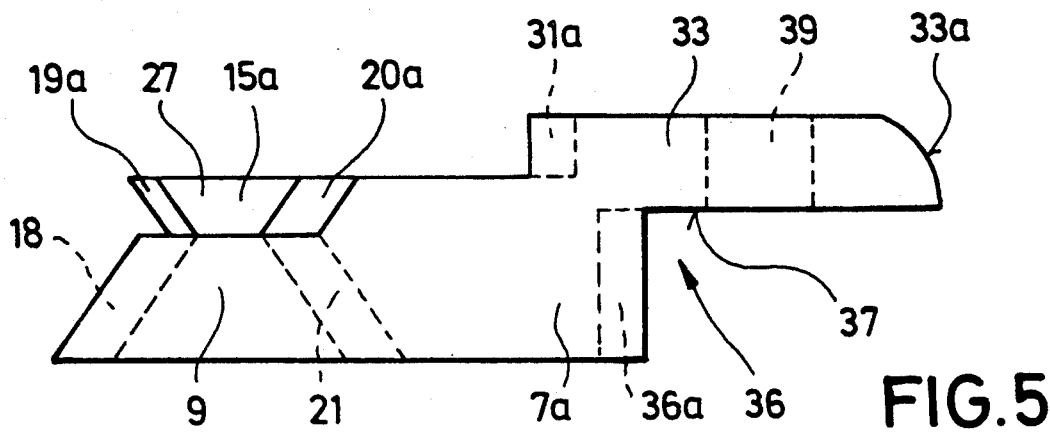
FIG. 5 shows a side view of an additional part of the coupling.
Figure 6:
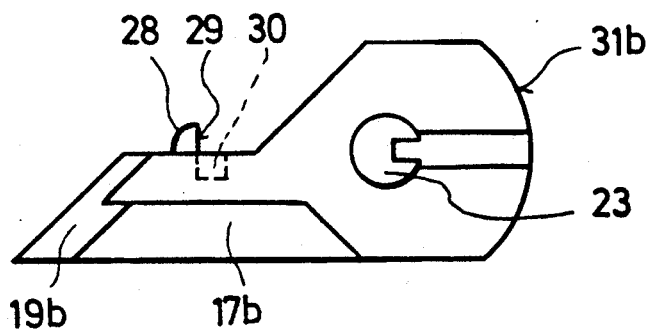
FIG. 6 shows a plan view from below of the part of FIG. 4.
Figure 7:
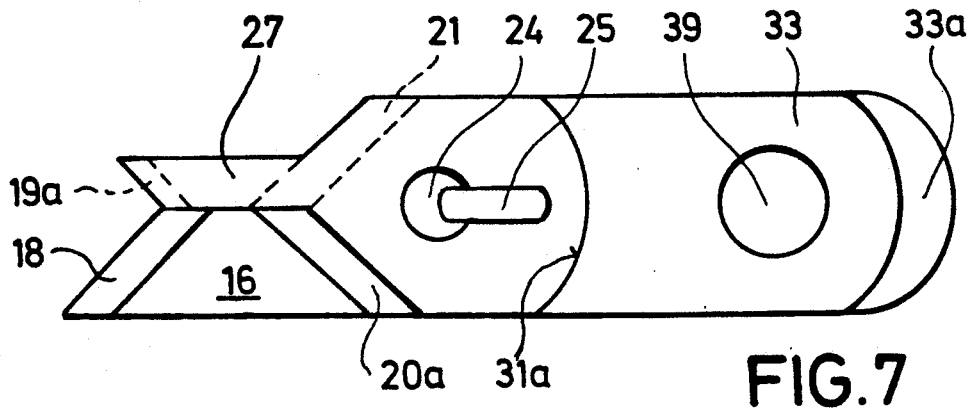
FIG. 7 shows a plan view from above of the part of FIG. 5.

FIG. 1 shows part of a suspension conveyor system 1, which is provided with a rail 2 suspended from a ceiling or the like. The rail 2 comprises two running surfaces, which are arranged relative to each other such that they define a roof shape; rollers 3, 3' can roll on these running surfaces in the direction of transport along the double arrow A. A respective pair of rollers 3, 3' rolling on opposite running surfaces is interconnected by a respective bow 4, 4'. Each of said bows 4, 4' is connected to one end of a conveyor means or units 5, 5'. In the case of the embodiment shown, the conveyor means 5, 5' are rods, which can be equipped with fastening means, not shown, for objects to be transported. It will be expedient when each end of each conveyor means 5, 5' has attached thereto a bow 4, 4', each of said bows 4, 4' is provided with two rollers 3, 3'.

The two conveyor means 5, 5' are interconnected by a coupling 6 whose components consist of plastic material. The coupling 6 consists of two identically constructed coupling members 7, 7', which are each connected to the associated conveyor means 5, 5' via a joint 8, 8' in such a way that they bridge the distance between the conveyor means 5, 5'. As can also be seen in connection with FIG. 2, the width and the height of the coupling 6 is adapted to the rod-shaped conveyor means 5, 5' in such a way that edges project neither within the coupling 6 nor at the transition with the conveyor means 5, 5' and that two opposite outer surfaces are constructed as surfaces 5a, 5b acted upon by a friction drive means, which is not shown in the drawing, said surfaces 5a, 5b extending, in alignment, continuously from the conveyor means 5, to the conveyor means 5' over both coupling members 7, 7' and joints 8, 8'.

The components of coupling 6 will be explained in detail in FIG. 3 to 8. In view of the fact that the two coupling members 7, 7' are constructed identically, their structural design will be described only on the basis of a single coupling member. The coupling member 7 has an essentially square cross-section; on its front side, which faces the opposite coupling member 7', two prismatic projections 9 and 10 protrude, said prismatic projections having the same length and an identical cross-section. The prismatic projections 9 and 10 are disposed in a symmetrical and diagonally opposed relationship with each other with respect to a longitudinal center line 11 through the coupling member 7.

Figure 8:
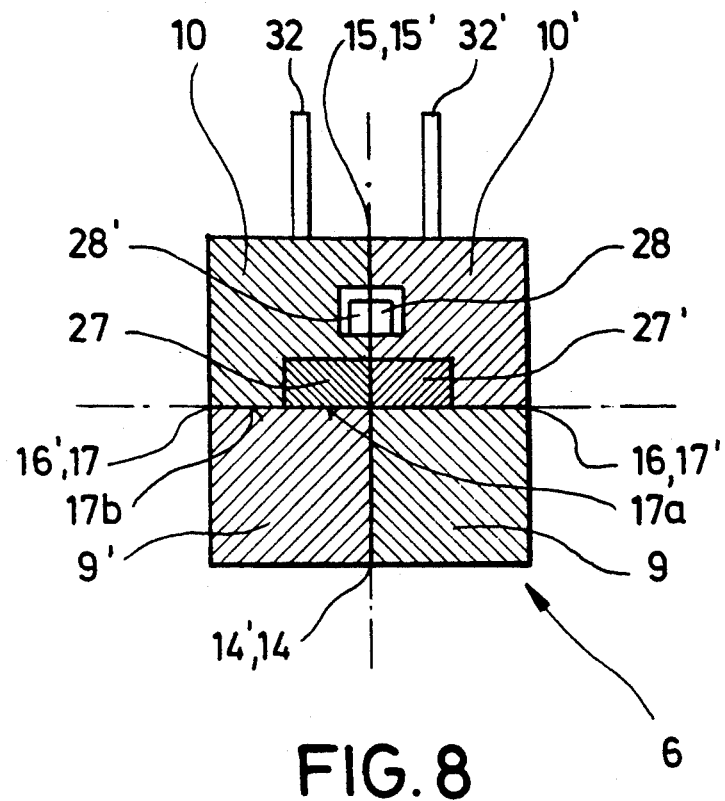
FIG. 8 shows a sectional view taken along the line VIII—VIII of FIG. 2.

In the other diagonal of the square cross-section of the coupling member 7, recesses 12 and 13 are provided whose dimensions are adapted to the dimensions of the prismatic projections 9, 10 in such a way that, when the coupling operation takes place, the recesses 12, 13 of the coupling member 7 can be engaged positively by the prismatic projections 9', 10' of the coupling member 7' and the recesses 12', 13' of said coupling member 7' can be engaged positively by the projections 9, 10 of said coupling member 7, whereby the square cross-section shown in FIG. 8 will be obtained. The flat boundary surfaces of each projection, which are directed towards the corresponding projection of the other coupling member and which extend parallel to the direction of transport, are constructed as lateral stop faces 14', 14 (between the projections 9 and 9') and 15, 15' (between the projections 10 and 10') as well as upwardly and downwardly directed stop faces 16', 17 (between the projections 9' and 10) and 16, 17' (between the projections 9 and 10'), which, in the coupled condition, abut on one another in the vertical and horizontal longitudinal center planes extending through the longitudinal center line 11.

Each of the prismatic projections 9, 10 has an end face 18, 19 at the front end thereof, each of said end faces 18, 19 being bevelled from diagonally opposed outer corners inwards in the direction of the longitudinal center line 11 and rearwards in the direction of the conveyor means 5. Each of the recesses 12, 13 terminates in an end face 20, 21, which are bevelled complementarily to the end faces 18', 19', but from their outer edges at an oblique angle forwards and inwards. In the coupled condition, also the end faces 18, 19 of the projections abut on the respective associated end faces 20', 21' of the recesses.

Each of the coupling members 7, 7' includes a first submember 7a, a second submember 7b being fastened to said first submember 7a such that it is adapted to be pivoted about a vertical axis 22 in the direction of the double arrow B. The second submember 7b includes part of the prismatic projection 10 with a subarea 15b of the lateral boundary surface 15 of the projection 10, a subarea 17b of the lower boundary surface 17 and a subarea 19b of the end face 19 as well as a subarea 20b of the end face 20 of the recess 12. The residual subarea 15a of the lateral boundary surface 15, the subarea 17a of the lower boundary surface 17 and the subarea 19a of the end face 19 of the projection 10 as well as the subarea 20a of the end face 20 are, however, part of the first submember 7a.

As can especially be seen from FIG. 4 to 7, submember 7b includes a pin 23, which is arranged around the axis of rotation 22 and which in a pin opening 24 provided on the first submember 7a. A leaf spring 25 extends through a slot, which is provided in the first submember 7a in the area of the pin opening 24 as well as in the pivot pin 23, so that the second submember 7b of the coupling member 7 will always return to the position shown in FIG. 3 due to the effect produced by this leaf spring 25. For this position, a stop means such as stop face 26, is additionally provided on submember 7b, said stop face 26 abutting on a finger 27, which belongs to the first submember 7a and which carries the subarea 15a of the boundary surface 15 and the subarea 19a of the end face 19. In the opposite direction, however, the second submember 7b can be pivoted outwards relative to the first submember 7a.

A coupling projection 28 protrudes from the subarea 15b of the second submember 7b and defines part of the lateral boundary surface 15 of the projection 10, said coupling projection 28 being provided with a flat coupling face 29 on its side facing the associated conveyor means 5 and the end face 20. The coupling face 29 extends a certain distance into the interior of a depression 30, which follows immediately after the coupling projection 28 in the direction of the end face 20. This depression 30 is dimensioned to receive therein a coupling projection 28' on the opposite coupling member 7'. The front side of the coupling projection 28, which faces away from the coupling face 29, is rounded or bevelled.

The second submember 7b of the coupling member 7 extends transversely of the longitudinal center line 11 over the whole width of the first submember 7a of the coupling member 7 and is received in a recess in the upper side of the first submember 7a of the coupling member. The rear areas of contact 31a and 31b, respectively, between the first and the second submembers 7a and 7b are curved about the axis 22. The second submember 7b has additionally secured thereto a release pin 32, which projects upwards. With the aid of this release pin 32, the second submember 7b can be pivoted about the axis 22.

Figure 9:
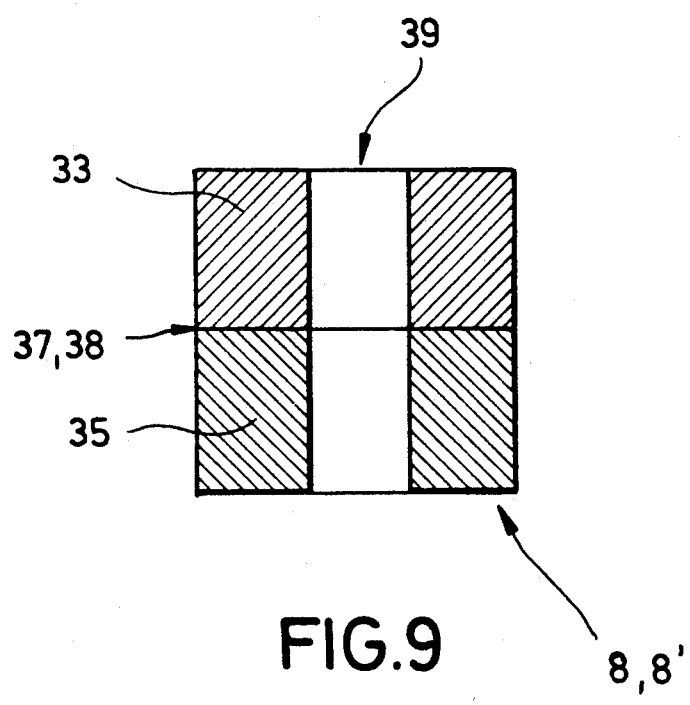
FIG. 9 shows a sectional view taken along the line IX—IX of FIG. 2.

In the area of the joint 8, the first submember 7a of the coupling member 7 includes a web 33, which is directed towards the conveyor means 5 and which engages a corresponding recess 34 provided on said conveyor means 5. A web 35 formed on the conveyor means 5 by the recess 34 engages, in turn, a recess 36 located below the web 33 on the first submember 7a of the coupling member 7. As can be seen in FIG. 9, the webs 33, 35 define together a square cross-section like to the cross-section of the coupling 6. The bottom side 37 of the web 33 rests on the top side 38 of the web 35. A hole 39, which receives therein a pin 40 (FIG. 1), extends through both webs 33, 35 of the joint 8, said pin 40 defining an axis of rotation 41, (FIG. 3). The front boundary surface 33a of the web 33, the rear boundary surface 34a of the recess 34, the front boundary surface 35a of the web 35 and the rear boundary surfce 36a of the recess 36 are curved about the axis of rotation 41. In addition, the front boundary surface 33a of the web 33 and the rear boundary surface 34a of the recess 34 constitute parts of a spherical surface so that the rear boundary surface 34a slightly overlaps the web 33 and represents a safety means preventing vertical displacement. The pin 40 has fixedly connected thereto the bow 4.

For the purpose of coupling, the two conveyor means 5, 5' are moved towards each other. When the two conveyor means 5, 5' have approached each other to such an extent that the rounded backs of the coupling projections 28, 28' contact each other, a further approach will have the effect that the second submembers 7b, 7'b of the coupling members 7, 7' are pivoted about their axis 22. In the course of this process, the subareas 15a, 15'a of the lateral boundary surfaces 15, 15' of the prismatic projections 10, 10' as well as the lateral boundary surfaces 14, 14' of the prismatic projections 9, 9' remain, however, in engagement with one another so that the position of the two coupling members 7, 7' with respect to the longitudinal center line 11 will not change. When the two conveyor means are pushed towards one another still further, the two coupling projections 28, 28' will move past one another and drop into the depressions 30, 30' located behind said coupling projections, whereby their coupling faces 29, will come into a position of engagement in which one of said coupling faces engages behind the other. When the coupling faces are in engagement with each other, also the end faces 18, 18', 19, 19' of the prismatic projections 9, 9', 10, 10' will abut on the end faces 21', 21, 20', 20, of the recesses 13', 13, 12', 12. Due to the distance between the coupling faces and e.g. the end faces 20, 20', which is identical in the case of both coupling members 7, 7', said coupling members 7, 7', when coupled, can no longer be displaced along the longitudinal center line 11 relative to each other under the influence of transporting forces. In view of the fact that also the lateral boundary surfaces 14, 15 which belong to the prismatic projections 9, 10 and which are directed away from each other remain in a position where they abut on the corresponding, lateral boundary surfaces 14', 15' of the prismatic projections 9', 10', a lateral horizontal displacement with respect to the longitudinal center line 11 will be prevented as well. A vertical displacement of the two coupling members 7, 7' is reliably prevented by means of the mutually abutting upper and lower boundary surfaces 16, 17, 16', 17' of the prismatic projections 9, 10, 9', 10'.

Furthermore, the present coupling even offers the possibility of automatically coupling also two coupling members 7, 7' which have arrived such that they are displaced by a certain distance with respect to each other relative to the longitudinal center line 11. This is achieved by means of the oblique end faces 18, 19, 18', 19' of the prismatic projections 9, 10, 9', 10', which act as centering surfaces.

For the purpose of decoupling, it will suffice to pivot the second submembers 7b, 7'b about the axis 22 outwards with the aid of the release pins 32, 32' and to move the conveyor means 5, 5' away from each other. The submembers 7, 7'b can be pivoted manually or with the aid of cams, which can be brought into engagement with the release pins at predetermined decoupling stations.

By providing submember 7b for each coupling member, during coupling, the two coupling members need no longer move relative to each other in their entirety, whereby the reliability of the coupling operation is improved.

Further, by dividing the stop face 15 into subareas 15a and 15b, the guiding function of the stop face 15a will be maintained even after the face 15b has been displaced by pivoting.

By constructing the coupling members 7, 7' with two opposed flat outer surfaces that extend parallel to the direction of transport of the conveyor units or rods 5, 5' and that are aligned with each other and with corresponding outer surfaces of the rods, it is ensured that a drive means will not alter the connection of the coupling members relative to each other in such a way that it will either impede the coupling operation or unintentionally release a connected coupling. Moreover, the drive of the whole conveying system by means of frictional wheels will be improved as well, since no projecting edges have to be traversed.

Because the end faces 18, 19 of the projections extend from an outward point inwards at an oblique angle in the horizontal as well as in the vertical direction, they provide an excellent centering effect so that coupling members which are displaced relative to each other laterally or vertically up to a certain extent can still be coupled without any difficulty.

Finally, by providing flat faces 29 on the projections 28, the coupling faces avoid, on the one hand, a certain amount of play, which would, for example, be necessary for engaging curved coupling faces in the direction of transport, and guarantee, on the other hand, that the two coupling members can be located as close as possible to one another in the engaged condition of the coupling.

Figure 10:
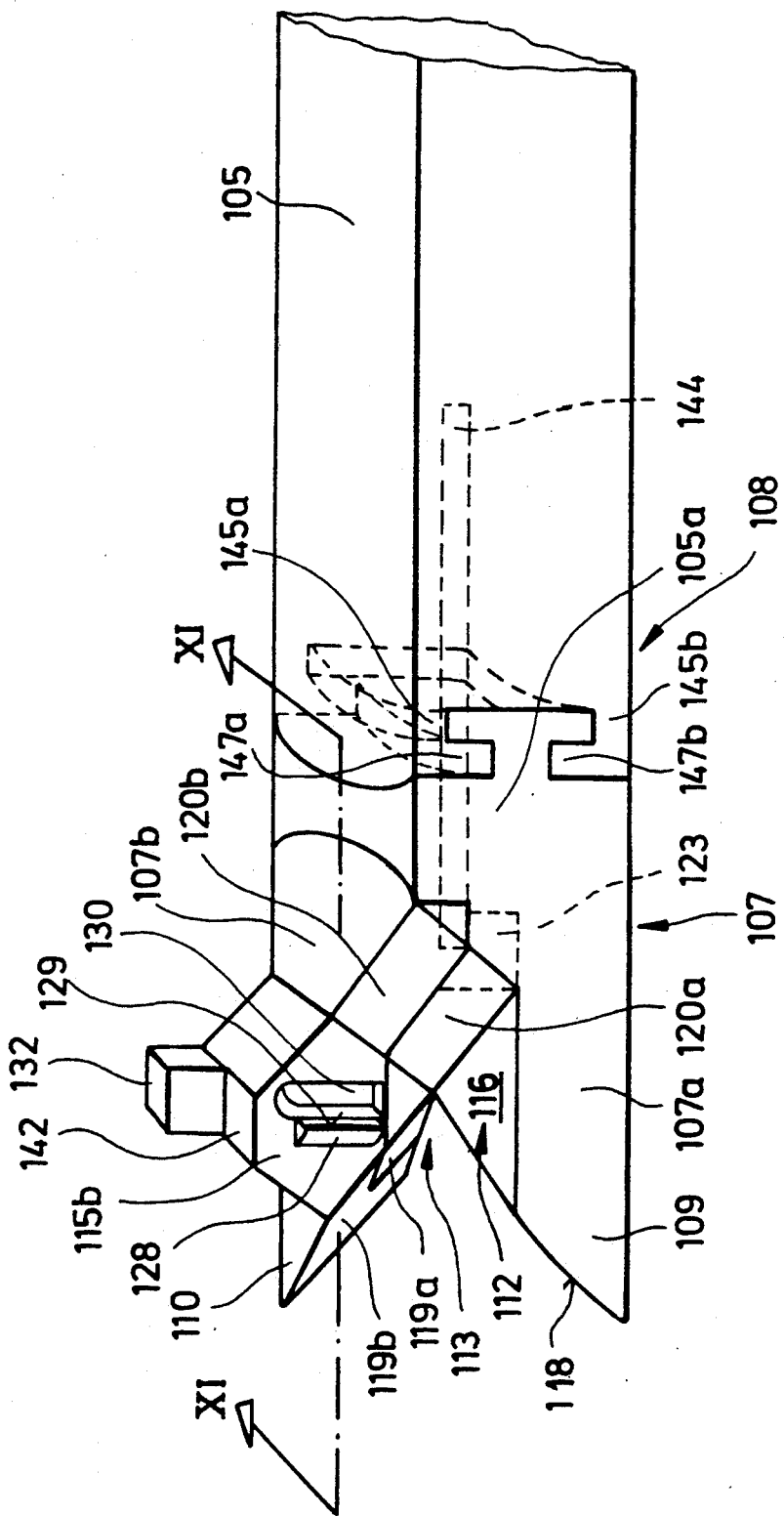
FIG. 10 shows a perspective view of a coupling member of an additional embodiment.
Figure 11:
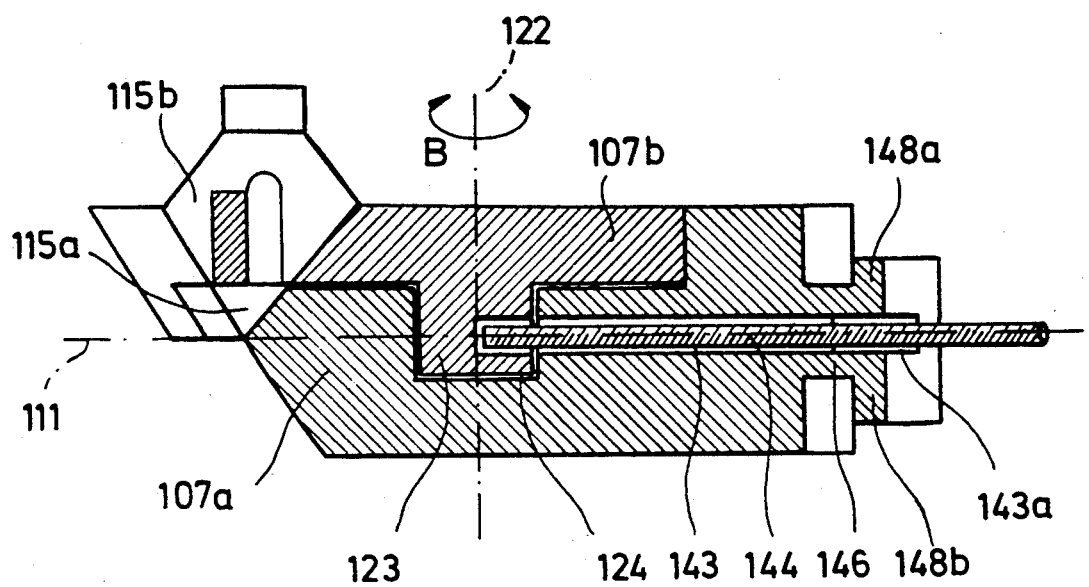
FIG. 11 shows a sectional view taken along the line XI—XI of FIG. 10.
Figure 12:
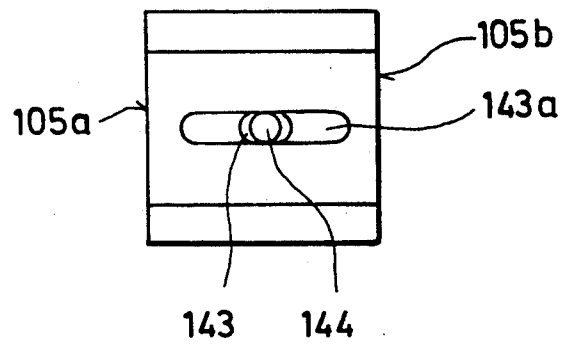
FIG. 12 shows a rear view of the coupling member of FIG. 10.

FIG. 10 to 12 disclose one of the coupling members 107 of an additional embodiment of the coupling according to the present invention; identical or comparable components are provided with the same reference numerals, having added 100 thereto, and are not explained again. Reference is only made to the fact that the release pin 132 has a particularly robust, square structural design and is arranged on a support ramp 142 so that the coupling can automatically be released more easily. The coupling projection 128 with its coupling face 129 is constructed as an elongated prism, which engages a recess 130 having an elongated configuration as well.

The second submember 107b of the coupling member 107 again engages by means of its pivot pin 123 a pin opening 124 on the first submember 107a. In a reception opening 143, an elongate spring 144 extends from the pivot pin 123 over the coupling member 107, the joint 108 up to an into the conveyor means 105. The spring 144 can be constructed as a leaf spring or, preferably, as a tightly wound helical spring. By means of the elongate spring 144, the second submember 107b as well as the whole coupling member 107 are acted upon in such a way that both members will always be located in a position suitable for coupling and that, in the coupled condition, the second submember 107b is spring-loaded in the coupling position. In order to avoid excessive local strain on the spring 144 in the area of the joint 108, the through hole 143 in the coupling member 107 is provided with a flatly funnel-shaped extension 143a, which is located in the area of the joint 108 and which permits the spring 144 to bend outwards with a comparatively large radius, when the coupling member 107 is pivoted relative to the conveyor means 105.

The joint 108 in the case of this embodiment includes an upper and a lower web 145a, 145b on the conveyor means 105, said upper and lower webs extending, like a pair of tongs, above and below a central web 146 on the coupling member 107. The webs 145a, 145b on the conveyor means 105 as well as the web 146 on the coupling member 107 have at their ends downwardly or upwardly directed vertical webs 147a, 147b and 148a, 148b, respectively, which extend one behind the other in the direction of transport. Each of the vertical webs 147a, 147b, 148a, 148b is constructed as part of an annular wall with the same diameter, and also the end faces of the coupling member 107 as well as of the conveyor means 105, which abut on said webs, are respectively rounded around the same center.

As a modification of the embodiment described and shown hereinbefore, the coupling can, for example, also have a different quadrangular, oval or round cross-section. Also the joint may have any other known shape. The release pins can also be laterally fastened to the coupling members or they can be replaced by other measures, such a release cams or the like.

I claim:

1. A coupling device for rigidly coupling together two spaced and elongated conveyor units that are aligned with each other and are adapted to be moved longitudinally in a direction of transport, said coupling device comprising two coupling members each being connected at one end to a conveyor unit, each of said coupling members having at least one prismatic projection that extends away from said one end of the member in the direction of transport of the units and at least one prismatic recess adapted to receive therein the prismatic projection of the other member, each prismatic projection having a first flat stop face that extends in a direction parallel to said direction of transport and that faces in a first direction perpendicular to said direction of transport and a coupling face that projects outwardly from said first flat stop face in a direction perpendicular to said direction of transport, the coupling face of at least one of said projections being movable relative to the coupling face of the other of said projections in a direction transverse to the direction of transport, and a second flat stop face on each of said coupling members that extends parallel to and is remote from said first stop face and that faces in a second direction opposite from said first direction, whereby when said coupling members are engaged and, said prismatic projections are received in said prismatic recesses, said first stop face of one projection abuts the first stop face of the other projection, the second stop face of one coupling member abuts the second stop face of the other coupling member and the coupling faces of each projection are engaged with each other to thereby couple the members together in the longitudinal direction of transport and prevent the coupling members from being offset with respect to each other in any direction transverse to said direction of transport.

2. The coupling device of claim 1, wherein each coupling member comprises a first submember and a second submember, means for pivoting said second submember about an axis relative to said first submember, the coupling face of each projection being located on said second submember.

3. The coupling device of claim 2, wherein the first flat stop face of the prismatic projection is divided into a first and a second subarea, the first subarea of the first face being located on the first submember and the second subarea on the second submember.

4. The coupling device of claim 2, wherein the second submember pivots relative to said first submember against the action of a spring means.

5. The coupling device of claim 4, wherein each member is also pivotally connected to a conveyor unit against the action of the same spring means, said spring means comprising an elongated spring member that extends from the second submember through the pivotal connection of the coupling member with the conveyor unit and into the conveyor unit to bias the second submember and the coupling member toward a longitudinal center line that extends in the direction of transport.

6. The coupling device of claim 1, in which each conveyor unit has two opposed, flat outer surfaces that extend in the direction of transport and each coupling member has two opposed, flat outer surfaces which extend in the direction of transport and which are in alignment with each other and with outer surfaces of the conveyor units.

7. The coupling device of claim 6, in which the cross-sectional shape of the coupling members is the same as the cross-sectional shape of the conveyor units.

8. The coupling device of claim 1, wherein each coupling member has two prismatic projections which are located in diagonally opposed relationship with each other with respect to a longitudinal center line of the coupling member, which line extends in the direction of transport, as well as two prismatic recesses located in similar diagonally opposed relationship with each other to receive therein said two prismatic projections of the other coupling member.

9. The coupling device of claim 8, wherein said first flat stop face and coupling face of each coupling member are located on a first one of said prismatic projections, and the second flat stop face of each coupling member is located on the other prismatic projection.

10. The coupling device of claim 8, wherein said prismatic projections have a square cross-section.

11. The coupling device of claim 8, wherein when said members are engaged, the two prismatic projections and the two prismatic recesses of the two coupling members define in combination a cross-sectional shape that is essentially uniform along its length.

12. The coupling device of claim 1, wherein each prismatic projection has an outer end face, opposite from said one end connected to a conveyor unit, that is slanted with respect to the direction of transport, said end face extending rearwardly toward said one end and inwardly toward a longitudinal center line of the member, which line extends in the direction of transport, from an outermost point at an oblique angle.

13. The coupling device of claim 1, wherein the coupling face on each projection is a flat face that engages in a corresponding recess in the projection of the other coupling member when the coupling members are engaged.

14. The coupling device of claim 1, wherein at least one coupling member is pivotally connected to a conveyor unit.

15. The coupling device of claim 14, wherein each coupling member includes a web that overlaps a web on the conveyor unit in the direction of transport when it is connected to said conveyor unit.

16. The coupling device of claim 14 or 15, wherein each coupling member includes a web that engages with a web on the conveyor unit when the member is connected to said conveyor unit and which webs interlock in a direction perpendicular to the direction of transport.

17. The coupling device of claim 14, wherein the coupling member pivots relative to said conveyor unit against the action of a spring means.

* * * * *